2,770,613
NOVEL PETROLEUM RESIN PROCESS

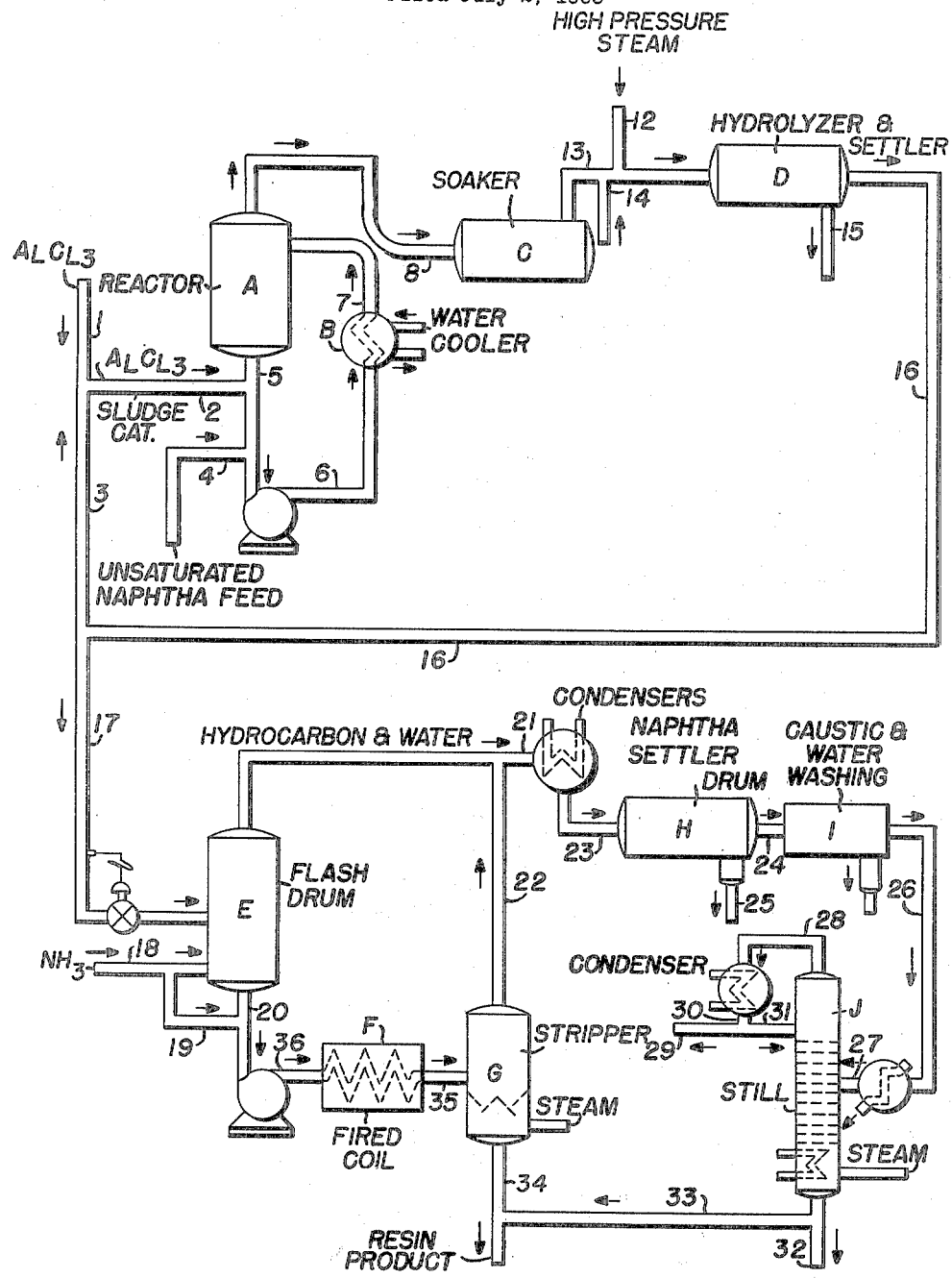

Bruce R. Tegge, Chatham, and Fred W. Banes, Westfield, N. J., assignors to Esso Research and Engineering Company, a corporation of Delaware Application July 2, 1953, Serial No. 365,739

8 Claims. (Cl. 260—82)

This invention relates to a novel process for the continuous production of petroleum hydrocarbon resins and, more particularly, to a process in which petroleum resins are made by a series of steps wherein the continuous synthesis, purification, and recovery of resins from steam cracked petroleum distillate fractions are carried out under critical conditions.

Hydrocarbon resins can be produced from certain petroleum refinery streams containing olefins and diolefins by methods of polymerization using Friedel-Crafts catalysts. The steam cracked streams have been found especially useful for this purpose.

There has now been discovered an improved process for the production of petroleum resins by the $AlCl_3$ catalyzed polymerization of steam-cracked distillates, including high temperature liquid phase hydrolysis of the reactor effluent, ammonia protection of the distillation equipment, and caustic washing of the overhead gasoline fraction after resin recovery.

In general, heavier petroleum fractions such as heavy naphtha, kerosene, gas oil, and the like, are cracked at relatively low pressures and at temperatures of 550 to 900° C. in the presence of steam and for relatively short contact times. The naphtha distillate streams obtained by these steam cracking operations contain relatively large amounts of diolefins, olefins, aromatics, and some paraffins. Ordinarily the liquid products are recovered as two streams by partial condensation of cracked products at approximately atmospheric pressure. One stream along with $C_4$ and lighter hydrocarbons is taken overhead and, after successive stages of fractionation to remove $C_1$, $C_2$, $C_3$ and $C_4$ hydrocarbons, remains as a residual light distillate containing $C_5$ through $C_8$ hydrocarbons. The second stream recovered as condensate represents largely $C_7$ plus hydrocarbons boiling up to about 280° C. This stream may contain minor quantities of $C_5$ and $C_6$ hydrocarbons.

Although the combined $C_5$ plus streams may be employed as polymerization feed naphtha, it is usually desirable to first treat the feed to convert cyclopentadiene monomers to their dimer and codimer forms. These monomers, if present in the feed to the extent of more than about 2% by weight, will give gel (insoluble polymer) during the start up period of the polymerization. However, it is not desirable to thermally soak the $C_5$-280° C. stream to effect cyclopentadiene dimerization since this tends to selectively polymerize certain active unsaturated compounds as styrenes and indenes boiling in the 150–250° C. range. Preferably then, the light $C_5$–$C_8$ distillate is heat treated alone for 6–9 hours at 90–140° C. to convert cyclopentadiene monomers to dimers. The heat treated stream is then blended with the heavier distillate or is distilled with steam or under vacuum to separate dimers as a bottoms product. The overhead from this distillation will contain less than 2 weight percent monomeric cyclopentadienes. It may be further topped to about 38° C. to recover a dilute isoprene fraction. Bottoms from this topping operation, together with any untopped material which by-passes this distillation, represent a desirable polymerization feed stream. This stream and the heavier distillate may be polymerized alone or in combination with each other.

The overall process of the invention includes the following necessary steps after obtaining the steam-cracked fraction:

1. Polymerization of the reactive hydrocarbons with fluid aluminum chloride catalyst in such a manner that the catalyst concentration in the reactor circulatory system is maximized at the point that this stream contacts fresh olefinic feed.
2. Treating the reactor effluent with water at about 300° F. and superatmospheric pressure.
3. Stripping unreacted naphtha and liquid polymer from the resin in the presence of ammonia.
4. Alkaline hydrolysis of the overhead from step 3 with soda ash or sodium hydroxide solution at about 150° C.
5. Distillation of the treated hydrocarbon from step 4 to recover a gasoline fraction overhead and liquid polymer as a bottoms fraction.

The steam-cracked feed distillates are streams or fractions thereof boiling in the range of 20 to 280° C. and are further characterized by the approximate composition:

|  | Weight percent |
|---|---|
| Diolefins | 10–35 |
| Olefins | 40–70 |
| Aromatics | 20–45 |
| Paraffin and Naphthenes | 0–20 |

The appropriate distillate feed is pumped to the reactor circulating system where it is mixed with the $AlCl_3$ containing catalyst and subsequently circulated through a cooler and reactor. After partial settling of hydrocarbon and catalyst sludge phases in the reactor, the material from the top of the reactor is passed to a soaker or time tank where, if desired, some of the catalyst sludge is separated. Any separated catalyst sludge may be either recycled to the reactor or purged from the polymerization system.

Although either $AlCl_3$ or $AlBr_3$ may be used in preparing petroleum resins by this process, cost considerations favor the use of the former. Boron trifluoride is less desirable since it tends to give lower molecular weight products. However, the direct use of solid $AlCl_3$ in the reaction zone has been found to be difficult to manipulate and handle especially when it is used in small quantities under careful control, as in the polymerization process. Dispersions, complexes or sludges of $AlCl_3$ in a hydrocarbon carrying medium can be handled most conveniently and metered or measured most satisfactorily.

For example, the solid $AlCl_3$ can be reacted with the naphtha, or steam-cracked distillate stream, to give reaction products containing from 10 to 50 weight percent catalyst. Ordinarily, about 10 to 50 weight percent of solid $AlCl_3$ is added to the hydrocarbon feed to prepare the catalyst. During the addition of the solid material, it is necessary to cool the reaction mixture, with agitation, in order to complete the dissolution or complexing of the solid catalyst. The resulting catalytic material is a dark colored fluid.

However, it is more advantageous to use reactor effluent or treated resin solution as the slurrying or complexing medium since less heat is evolved upon addition of $AlCl_3$. Furthermore, the presence of dissolved resin improves the stability and suspendability of the catalyst preparation so that a uniform, pumpable catalyst is produced.

The catalyst preparation usually contains 10 to 50% $AlCl_3$ by weight and is prepared by adding the proper quantity of solid AlCl$_3$ to an agitated and water cooled vessel containing the resin solution. The AlCl$_3$-hydrocarbon mixture is agitated at temperatures controlled to 70° C. or lower until a uniform composition is attained. This catalyst largely represents complexes of the AlCl$_3$ type with components of the resin solution and is stabilized with respect to settling by the dissolved resin.

Optimum resin yields are obtained at polymerization temperatures ranging from 10 to 60° C. Higher polymerization temperatures are to be avoided in this system since these conditions result in increased yields of low molecular weight by-product polymers and products. It is especially desirable to polymerize the steam-cracked distillates under reaction conditions wherein the ratio of catalyst to olefinic reactants is maintained as high as possible. This is accomplished by proper design of the reactor circulating system so that the catalyst concentration at the fresh feed inlet point is maintained as high as possible. This is accomplished by:

(1) Taking product resin solution off from the top of the reactor and returning the recirculated reactor mixture to the reactor at some point below the product draw-off. This increases the effective catalyst concentration in the reactor by preferential settling of the more dense catalyst complex or sludge phase.

(2) Increasing the reactor pumparound circulation rate.

Fresh feed is pumped into the reactor circulating system at a rate of 0.6 to 6.0 volumes per volume of reactor system per hour and the contents of the reactor are recirculated at a rate of 20 to 300, preferably 50 to 250, reactor volumes per hour. Catalyst preparation is added to the system at a rate equivalent to 0.1 to 2.0% by weight AlCl$_3$ on the fresh feed and the AlCl$_3$ in the circulating system of the reactor is maintained at 0.2 to 10% by weight on the reactor contents depending on the amount of AlCl$_3$ fed to the system per unit weight of fresh feed.

Operating in the above manner, product solution from the top of the reactor passes at a rate of 0.6 to 6.0 reactor volumes per hour to a second stage wherein the reaction is completed. After allowing time for the catalyst to build up in the reactor, the catalyst concentration in the solution going to the second stage will be essentially the same as that added to fresh feed. The residence time in the second stage is 10 to 75 minutes and as noted earlier any catalyst complex or sludge can be partially separated in this stage and returned to the reactor or carried on to the subsequent finishing stages.

It is most desirable to effectively complete the polymerization reaction in a minimum number of stages and this is accomplished by the above process wherein the bulk of the reaction occurs in the first stage.

After sufficient residence time in a reactor soaking tank or settler, the reactor effluent is then pumped through an orifice mixer. Here it is contacted with water at about 100–200° C. and superatmospheric pressure to remove dissolved and entrained AlCl$_3$ sludge and complexes from the hydrocarbon phase. High temperatures are employed to minimize the emulsion formation and enhance phase separation rates by hydrolyzing and dissolving as much of the AlCl$_3$ complexes as possible in the aqueous phase. Because of the acid conditions in this system, protective linings of steel tanks and HCl-resistant alloys are used as construction materials. Pumps, heat exchangers and the like can be avoided by direct injection of high pressure steam to maintain the hydrolyzing temperature at about 100–200° C.

Resin recovery is accomplished by flashing the high pressure hydrocarbon phase into a low pressure flash drum where 1–20 weight percent of the unreacted naphtha is taken overhead. In order to control corrosion in this drum a small amount of ammonia is added. The flash drum bottoms, which contain the bulk of the unreacted hydrocarbons and low molecular weight polymer oils and resin, are pumped to a vaporizer furnace and flashed into a stripping tower. A small amount of ammonia is also added to the vaporizer feed to control corrosion. The total ammonia added to the system need be only 0.005 to 0.5 weight percent on the total resin solution, the amount depending on the per cent by weight of catalyst employed. About 75–90% of the ammonia is injected into the vaporizer feed stream. Ammonium chloride vapor is taken overhead by proper maintenance of the temperature and pressure conditions in the stripping tower. The combined overhead vapors from the low temperature flash drum and the stripper tower are condensed in one and preferably two or more step-down stages and sent to a separator where water, containing ammonium chloride and ammonia hydroxide, is removed.

Some alkyl chlorides are invariably produced by interaction of HCl with olefinic compounds and since such compounds have a deleterious effect on gasoline quality it is usually necessary that they be converted to less harmful materials. This is accomplished by treating the hydrocarbon solution at 100 to 200° C. with 0.05 to 0.5 volumes of 2–10-wt. percent NaOH or Na$_2$CO$_3$ solution. At these temperatures the alkyl chlorides are hydrolyzed to harmless hydroxy compounds. No emulsion problems are encountered by this high temperature treatment whereas treating resin solution in the same manner at lower temperature often produces very stable emulsions.

After separating the caustic solution phase by settling, the hydrocarbon phase is fractionated to recover a C$_5$–220° C. overhead gasoline cut and liquid polymer bottoms. The latter may be blended with the stripped resin to control resin softening point. The stripped resin bottoms from the high temperature stripping zone may be diluted with suitable naphthas and solvents for viscosity control if desired.

The process as outlined accomplished several objectives, including the following:

(1) It provides for an operation that can be carried out with a minimum amount of corrosion-resistant equipment.

(2) It provides for the removal of catalyst residues from the polymerizate solution thereby giving a light-colored, non-corrosive, low-ash petroleum resin product.

(3) It provides for the removal of catalyst complexes and residues and alkyl chlorides from the unreacted portion of the naphtha feed (raffinate). The product naphtha is therefore a suitable component for gasoline.

(4) It provides for a practical method for increasing resin yield and quality by maintaining the ratio of AlCl$_3$ sludge to diolefin in the reaction zone at an increased level.

(5) It provides a practical method for removing the AlCl$_3$ sludge catalyst from the resin product without the formation of troublesome emulsions by using high temperature, high pressure washing methods.

The invention will be illustrated in greater detail by the following example and the accompanying diagram although it is not intended to limit the invention specifically thereto.

*Example 1*

The selected steam cracked naphtha feed stream is pumped via line 4 to the continuous reactor circulative system through line 6 to the water cooler B and thence by line 7 to reactor A. An AlCl$_3$ containing catalyst consisting of AlCl$_3$ complexed with washed polymerizate from lines 16 and 3 enters the reactor system by means of line 2. The polymerization of the unsaturated naphtha feed takes place in the reactor system, mainly in reactor A, at a temperature of about 35 to 55° C. The polymerization mixture of naphtha feed and catalyst slurry is continuously circulated by pumps via lines 5, 6 and 7 through water cooler B and reactor A. The hold-up of the mixture in reactor A is equivalent to 0.6 to 6.0 v./v./hr. The circulation rate is in the range of ⅓ to 5 volumes of the reactor per minute. The polymerization reaction mixture is withdrawn overhead from reactor A by line 8 to soaker C. After sufficient time in the reactor circulating system A and soaker C, the reactor effluent is pumped through an orifice mixer and to hydrolyzer D by line 13. It is contacted with water introduced by line 14 and high pressure steam by line 12 at a temperature of about 150° C. In the hydrolyzer D, the reaction mixture is separated from the water phase to remove dissolved and entrained $AlCl_3$ sludge and complexes from the hydrocarbon phase. A relatively high temperature is employed to minimize the emulsion and settling problems by hydrolyzing and dissolving as much as possible of the complexed $AlCl_3$ complexes in aqueous phase.

The aqueous phase is removed by line 15. The resin product is recovered from the hydrocarbon phase. This hydrocarbon phase is passed by lines 16 and 17 into low pressure flash drum E into which a small amount, 0.005 to 0.5 weight percent, of ammonia is added to the system by lines 18 and 19 to control corrosion. The bottoms from flash drum E are pumped by lines 20 and 36 to a fired coil vaporizer furnace F. The effluent from furnace F is passed by line 35 to stripper column G which is operated at about 250-300° C. Steam is injected into the lower portion. Unpolymerized hydrocarbons and low molecular weight polymers are taken overhead as stream 22 and combined with the flash drum overhead stream as a total stream 21. The bottoms stream 34 from stripper 6 is removed as finished resin product.

The combined vapor stream 21 is condensed and passed by line 23 to settler H in which a hydrocarbon phase and an aqueous phase are obtained. The aqueous phase containing residual $NH_4Cl$ and $NH_4OH$ is removed by line 25. The hydrocarbon phase is passed by line 24 to a caustic treating stage I operating at about 150° C. After separating an aqueous phase the hydrocarbon solution is passed by line 26 to distillation tower J into which steam is injected. In tower J, unreacted naphtha is taken overhead by line 28 and condensed. A part is returned to tower J by lines 30 and 31 as reflux, and the remainder removed as stream 29.

Low molecular weight polymer is removed as a bottoms stream from tower J by line 32. If desired, a part may be passed by line 33 and combined with stream 34 and thereby blended with the finished resin to control softening point characteristics.

Example 2

A steam cracked distillate boiling in the range of 30 to 140° C. and containing about 20% conjugated acyclic diolefins, 53% olefins and 27% aromatics and less than 2 wt. percent cyclopentadiene monomers was polymerized in a two-stage continuous process as described in Example 1. The catalyst, comprising a complex or sludge of 25 wt. percent $AlCl_3$ in flash drum bottoms was fed to the system at a rate of 1 wt. percent $AlCl_3$ on fresh feed. Fresh feed was added to the reactor at a rate of 1 v./v./hr. and the contents of the reactor were circulated at a rate of 180 reactor volumes per hour. At an operating temperature of 45° C., the resin product in the effluent from first stage represented a 36 wt. percent yield of 90° C.[1] softening point resin having a Gardner color index of 2[2]. The concentration of $AlCl_3$ in the circulating reactor solution was in the range of 4-6 wt. percent. When the effluent from the first stage was passed to a second stage having an additional residence time of one hour, the final yield of 90° C.[1] softening point resin was 37.9 wt. percent on the feed. When the first reactor recirculation rate was reduced to 20 reactor volumes per hour, the yield of 90° C. softening point resin dropped to 34 wt. percent as compared to 36 wt. percent yield obtained at the higher circulation rate. In all cases the product resins had ash contents lower than 0.04 wt. percent.

The reactor effluents from the above reactions were contacted with water (0.5 volume/volume resin solution) for 30 minutes at 150° C. The aqueous layer separated clearly from the hydrocarbon phase and titration of the aqueous phase for HCl indicated over 75% removal of $AlCl_3$ from the resin solution. The treated hydrocarbon solutions were then flashed to recover about 20% of the unreacted hydrocarbons and then steam stripped to a bottoms temperature of 260° C. to recover resin product. Water, hydrocarbons and ammonia or reaction products thereof were taken overhead and condensed. Water was separated from the hydrocarbon layer. Further fractionation of the hydrocarbon layer gave 8-10 wt. percent of liquid polymer and 90-92 wt. percent of a gasoline fraction.

Example 3

A sample of overhead hydrocarbon from the resin stripping operation contained 0.037 wt. percent chlorine equivalent to about 0.14 wt. percent alkyl chloride of an average $C_7$ molecular weight. This hydrocarbon was contacted with an excess of 4 wt. percent NaOH in an agitated pressure vessel at 150° C. Back titration of excess caustic in the aqueous layer indicated that over 95% of the alkyl chlorides had been hydrolyzed.

Example 4

A series of polymerizations was carried out using a steam cracked distillate boiling in the range of 38 and 125° C. The naphtha contained about 17% conjugated acyclic diolefins, 47% olefins and 36% aromatics and less than 2% cyclopentadiene monomers by weight. The polymerization system described in Example 1 was employed using a feed rate of 4 v./v./hr. and a circulation rate of 180 reactor volumes per hour. The catalyst, comprising a complex or sludge of 30 wt. percent $AlCl_3$ in washed polymerizate, was added to the reactor circulating system at a rate equivalent to about 0.75-1.0 wt. percent $AlCl_3$ on fresh feed. The effluent from the first reaction stage was passed through a second stage of the same size at the same rate. The resin yield represented 37 wt. percent of 90° C. softening point resin based on the feed.

Example 5

Two stage polymerization was carried out with the naphtha of Example 3 using solid $AlCl_3$ to the extent of 0.25 wt. percent on fresh feed. The feed rate was maintained at 1 v./v./hr. and the reactor circulation rate was about 200 reactor volumes per hour. Residence time in in the second stage was one hour. In this case a 29.6 wt. percent yield of 95° C. softening point resin was obtained. The resin was light colored (Gardner color index of 2). When using the same reaction conditions except in that the percent $AlCl_3$ on fresh feed was increased to 2 wt. percent, a 36 wt. percent yield of 96° C. softening point resin was obtained.

What is claimed is:

1. An improved process for making hydrocarbon resins which comprises the steps of polymerizing a $C_5$ plus unsaturated hydrocarbon stream boiling up to 280° C. with a fluid aluminum chloride catalyst, contacting in presence of the remaining active catalyst the resulting reactant mixture with water in liquid phase at about 100-200° C. and subjecting the hydrolyzed mixture to stripping to recover an unreacted hydrocarbon fraction and a light-colored, low ash resin.

2. An improved process for making hydrocarbon resins which comprises the steps of continuously polymerizing a diolefin-containing $C_5$ plus unsaturated hydrocarbon stream boiling from 20 to 280° C., in the presence of an aluminum chloride catalyst complex, maintaining an effective $AlCl_3$ concentration within the reacting system of 2

---
[1] Ring and ball method ASTM E-28-51-T.
[2] Color of a solution of 1 gram of resin in 67 ml. of xylene.

to 10 times that in the reactor effluent stream, hydrolyzing in presence of the remaining active catalyst the resulting reactant effluent with water in the liquid phase at about 125–175° C., separating from the hydrolyzed mixture an unreacted hydrocarbon fraction and a light-colored, low ash resin.

3. An improved process for making hydrocarbon resins which comprises the steps of continuously polymerizing a selected steam-cracked petroleum fraction boiling from 20 to 280° C. and having unsaturated components by contact with a fluid aluminum chloride catalyst, subjecting the hydrocarbon phase from the reactor to aqueous liquid phase hydrolysis in presence of the remaining active catalyst at a temperature of about 150° C., distilling unreacted petroleum naphtha from the petroleum resin in the presence of ammonia, thereby obtaining a light-colored petroleum resin, having an ash content below 0.04 wt. percent.

4. An improved process for making resins from steam-cracked hydrocarbon fractions which comprises the steps of continuously contacting an unsaturated fraction of $C_5$ plus hydrocarbons boiling up to 280° C. with an aluminum chloride complex in a reaction zone, maintaining the contacting conditions at 0.6 to 6.0 v./v./hr., subsequently hydrolyzing in presence of the remaining active catalyst the hydrocarbon phase from the reactor in liquid phase at elevated pressure and temperature of about 150° C., distilling the resulting mixture in the presence of ammonia, recovery of an overhead gasoline fraction and a low ash, light-colored resin, and treating the recovered gasoline fraction with caustic solution of 2 to 10 wt. percent concentration at a temperature of about 150° C.

5. An improved process for making resins from steam-cracked hydrocarbon fractions which comprises the steps of continuously polymerizing a hydrocarbon fraction having about 10–35 wt. percent diolefins, 40–70 wt. percent olefins, 20–45 wt. percent aromatics and 0–20 wt. percent paraffins and naphthenes with a fluid aluminum chloride complex catalyst at a temperature of 10 to 60° C., maintaining an effective $AlCl_3$ concentration within the reactor of about 2 to 10 times that of the reactor effluent stream, subjecting the reactor effluent to a high pressure liquid phase hydrolysis in presence of the remaining active catalyst at a temperature of about 150° C., and separating a solid, light-colored petroleum resin of low ash content from the hydrolyzed mixture.

6. An improved process for making resins from steam-cracked hydrocarbon fractions which comprises the steps of continuously polymerizing a hydrocarbon fraction having about 10–35 wt. percent diolefins, 40–70 wt. percent olefins, 20–45 wt. percent aromatics and 0–20 wt. percent paraffins and naphthenes with a fluid aluminum chloride complex catalyst at a temperature of 10 to 60° C., maintaining an effective $AlCl_3$ concentration within the reactor of about 2 to 10 times that of the reactor effluent stream, subjecting the hydrocarbon phase of the reactor effluent to a high pressure liquid phase hydrolysis in presence of the remaining active catalyst at a temperature of about 150° C., and separating a solid, light-colored petroleum resin of low ash content from the hydrolyzed mixture.

7. An improved process for making hydrocarbon resins which comprises the steps of continuously polymerizing with an $AlCl_3$-containing catalyst of 0.25 to 3.0 wt. percent concentration based on the fresh feed, in a recirculating reactor system having at least one reactor stage, a steam-cracked distillate fraction boiling in the range of 30 to 140° C. and containing 10–35% acyclic conjugated diolefins, 40–70% olefins, 20–45% aromatics and less than 2% cyclopentadiene monomers maintaining an effective $AlCl_3$ concentration in the first stage of the recirculating reactor system of 2 to 10 times that in the outlet stream from the reactor, maintaining a fresh feed stream rate of 1 to 4 v./v./hr. and a circulating rate of 20 to 300 reactor volumes per hour, subsequently hydrolyzing in presence of the remaining active catalyst the effluent from the reactor in the liquid phase at a temperature of about 150° C., distilling unreacted petroleum naphtha from the petroleum resin, thereby obtaining a light-colored petroleum resin, having an ash content below 0.04 wt. percent.

8. An improved process for making hydrocarbon resins which comprises the steps of continuously polymerizing with an $AlCl_3$ complex of 0.25 to 3.0 wt. percent concentration based on the fresh feed, in a recirculating reactor system having a multiplicity of reactor stages, a steam cracked distillate boiling in the range of 30 to 140° C. and having less than 2% cyclopentadiene monomers maintaining an effective $AlCl_3$ concentration in the first stage of the recirculating reactor system of 2 to 10 times that in the outlet stream from the reactor, maintaining a fresh feed stream rate of 1 to 4 v./v./hr. and a circulating rate of 20 to 300 reactor volumes per hour, subsequently hydrolyzing in presence of the remaining active catalyst the hydrocarbon phase from the reactor in liquid phase at elevated pressure and temperature of about 150° C., distilling the resulting mixture in the presence of ammonia, to recover an overhead gasoline fraction and a low ash, light-colored resin, and treating the recovered gasoline fraction with caustic solution of 2 to 10 wt. percent concentration at a temperature of about 150° C.

References Cited in the file of this patent

UNITED STATES PATENTS

| | | |
|---|---|---|
| 1,982,708 | Thomas | Dec. 4, 1934 |
| 2,023,495 | Thomas | Dec. 10, 1935 |
| 2,039,363 | Thomas | May 5, 1936 |
| 2,521,022 | Rowland | Sept. 5, 1950 |